G. D. MORRISON.
BOLT EXTRACTOR.
APPLICATION FILED FEB. 14, 1908.
913,226.
Patented Feb. 23, 1909.
3 SHEETS—SHEET 1.
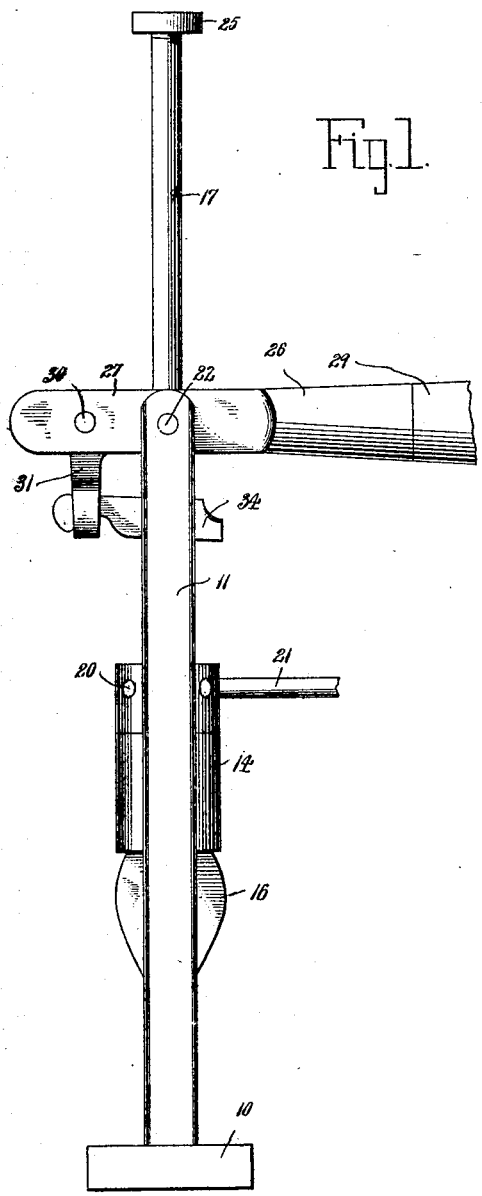
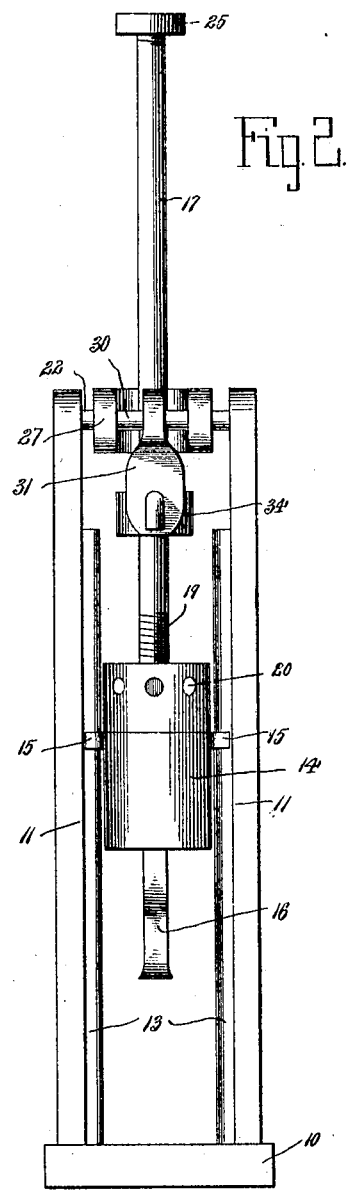
Inventor
George D. Morrison.

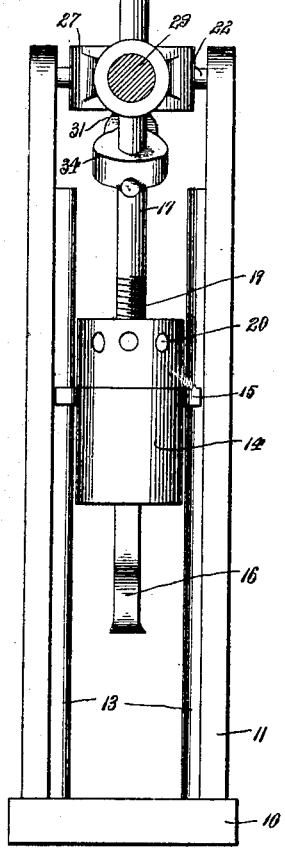
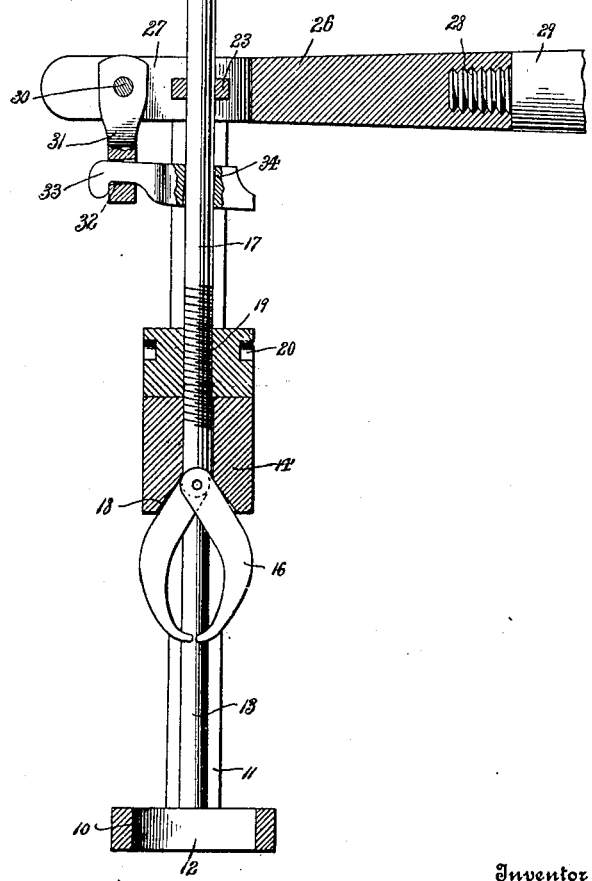

G. D. MORRISON.
BOLT EXTRACTOR.
APPLICATION FILED FEB. 14, 1908.
913,226.
Patented Feb. 23, 1909.
3 SHEETS—SHEET 3.
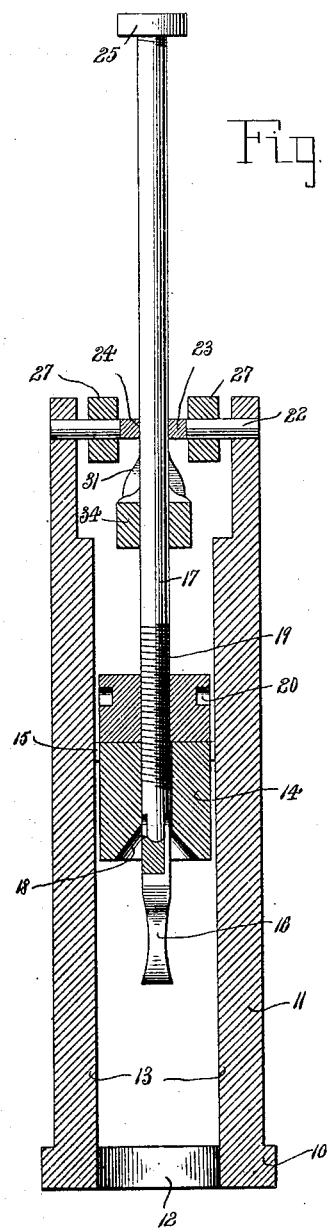
Fig. 5.
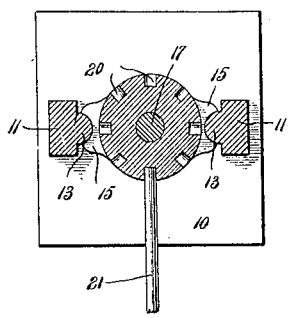
Fig. 7.
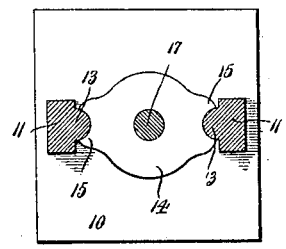
Fig. 6.
Witnesses
J. H. Crawford
Fr. G. Smith
Inventor
George D. Morrison,
Attorneys

UNITED STATES PATENT OFFICE.

GEORGE D. MORRISON, OF GADBERRY, KENTUCKY.

BOLT-EXTRACTOR.

No. 913,226.  Specification of Letters Patent.  Patented Feb. 23, 1909.

Application filed February 14, 1908. Serial No. 415,943.

*To all whom it may concern:*

Be it known that I, GEORGE DALLAS MORRISON, a citizen of the United States, residing at Gadberry, in the county of Adair, State of Kentucky, have invented certain new and useful Improvements in Bolt-Extractors; and I do hereby declare the following to be a full, clear, and exact description of the invention, such as will enable others skilled in the art to which it appertains to make and use the same.

This invention relates to bolt extractors and more particularly to that class which are designed principally for use in railroad and bridge construction work.

More specifically speaking, the device is of that type in which the extracting member proper is jacked up by a lever operated friction clutch mechanism. Heretofore, in connection with the extracting member it has been customary to employ two friction clutch elements, one operable for the purpose of jacking the member and the other serving to hold the member at the various points at which it is jacked. I have in view, in carrying out my invention, the provision of a jacking mechanism in which only one friction clutch element is employed and to attain this result, I provide in connection with the extracting member, means coöperating with its jaws for positively clutching the bolt or spike to be extracted. Not only does the provision of such means obviate the employment of a friction clutch element for holding the extracting member at the various points at which it is jacked, but it serves also to prevent loss or dropping of the bolt or spike.

In the accompanying drawings, Figure 1 is a side elevation of the extractor, Fig. 2 is a front elevation thereof, Fig. 3 is a rear elevation, Fig. 4 is a vertical sectional view taken in a plane with the operating lever, Fig. 5 is a similar view but taken in a plane at right angles to the plane of Fig. 4, Fig. 6 is a detail horizontal sectional view taken in a plane directly above the upper end of the jaw engaging member of the extracting member proper, and, Fig. 7 is a similar view but taken in a plane above the plane of Fig. 6.

The device is illustrated in the drawings as comprising a base 10 formed integral with which are vertically extending uprights 11, the base being formed with an opening 12 so that it may be placed to surround the head of the bolt or spike and the uprights being located one to each side of the opening. The uprights 11 are formed upon the opposing sides each with a guide rib 13 and a sleeve 14 is formed at its upper end with notched ears 15 which engage with these ribs and serve to hold the sleeve between the uprights for vertical sliding movement. Two coöperating jaws 16 are pivoted to the lower end of an extractor rod 17 which is slidably engaged through the bore of the sleeve and these jaws are designed to engage with the head of the bolt or spike to be extracted. The upper portions of the outer edges of the two jaws are directed in downwardly diverging planes and the bore of the sleeve, at its lower end, is enlarged, in a flared manner as at 18 to receive the upper portions of the jaws. It is intended that this sleeve 14 is to be forced down upon the jaws after they have been engaged with the head of the bolt or spike to be extracted and in order that the sleeve may be so moved, the rod 17 is threaded from a point adjacent its lower end, in an upward direction and a sleeve nut 19 is engaged upon the rod and with this threaded portion, the nut being formed with a number of sockets 20 for the reception of the end of a hand bar 21 which may be grasped to rotate the nut and force the sleeve into engagement with the jaws above described, it being understood of course that this manipulation of the nut and sleeve will cause the jaws to firmly grasp or clutch the said head of the bolt or spike.

The means for jacking up the rod to extract the bolt clutched by the jaws thereof will now be described. The upper ends of the uprights 11 are connected by means of a cross piece 22 and this cross piece is formed at its middle with an enlargement 23 through which an opening 24 is formed, the rod 17 being passed upwardly through this opening and provided at its upper end with a removable head 25 of larger diameter than the opening 24 so as to prevent dropping of the rod through the opening. A head 26 is formed with spaced arms 27 which are pivoted to the cross piece 22 with the enlarged portion of the cross piece 23 received therebetween and this head is also formed with a socket 28 for the reception of one end of a hand bar 29 which, in conjunction with the head, constitutes a jacking lever. A pin 30 connects the forward ends of the arms 27 of the head 26 and pivoted to this pin is the upper end of a link 31, the lower end of the link being formed with an opening 32 for the reception of a lug 33 which is formed integral with a clutch collar 34 engaged upon the rod 17.

From the foregoing description of my invention, and from an inspection of the drawings, it will be understood that the device is first placed with the base 10 inclosing the head of the bolt or spike to be extracted and that the rod is then lowered and the jaws engaged with the said head, the sleeve nut 19 being then tightened to render this engagement positive. The jacking lever is then oscillated in a vertical plane and the extractor rod jacked up, it being understood that by reason of the positive engagement of the jaws with the bolt or spike, the employment of a friction clutch element for supporting the rod at the various points at which it is jacked, is obviated and at the same time, dropping of the bolt from the jaws after having been extracted is prevented.

What is claimed, is:—

A bolt extractor comprising a pair of spaced parallel bars having oppositely disposed guides formed on the inner faces thereof, a block held to slide on said guides, a rod extending through and supporting said block, a clamp carried at the lower end of the rod, a cross bar connecting the first bars and having an opening to receive and guide the upper end of said rod, a lever fulcrumed on said cross bar, a link carried by said lever, and a clutch collar adapted to engage the rod connected to said link.

In testimony whereof, I affix my signature, in presence of two witnesses.

GEORGE D. MORRISON.

Witnesses:
C. C. JONES,
ROBERT JOHNSON.